United States Patent [19]

Bott et al.

[11] 4,135,759
[45] Jan. 23, 1979

[54] ARMREST FOR PASSENGERS OF MOTOR VEHICLES

[75] Inventors: Helmuth Bott, Pforzheim; Siegfried Nothacker, Kulmbach, both of Germany

[73] Assignee: Dr. Ing. h.c.F. Porsche Aktiengesellschaft, Germany

[21] Appl. No.: 796,383

[22] Filed: May 12, 1977

[30] Foreign Application Priority Data

May 28, 1976 [DE] Fed. Rep. of Germany ....... 2623954

[51] Int. Cl.² .............................................. B60N 1/06
[52] U.S. Cl. .................................. 296/153; 108/137; 248/284

[58] Field of Search ................ 296/153; 297/411, 417, 297/412; 248/118, 284; 108/137

[56] References Cited

U.S. PATENT DOCUMENTS

| 1,706,634 | 3/1929 | Seils | 296/153 |
| 2,766,463 | 10/1956 | Bendersky | 297/411 |
| 2,822,229 | 2/1958 | Carlson | 248/284 |

Primary Examiner—Robert R. Song
Attorney, Agent, or Firm—Craig & Antonelli

[57] ABSTRACT

An armrest for passengers of vehicles, especially of motor vehicles, which is constructed so as to be adjustable preferably in the vehicle transverse direction.

16 Claims, 5 Drawing Figures

ARMREST FOR PASSENGERS OF MOTOR VEHICLES

The present invention relates to an armrest for passengers of vehicles, especially of motor vehicles.

A prior art armrest is mounted fixedly in the vehicle transversed direction at the vehicle door. As a result thereof, the passenger has no possibility to displace the armrest into a far-reachingly individual position comfortable to the passenger, whence especially during drives over longer periods of time the comfort is strongly impared. On the other hand, a fixed armrest will hardly ever possess the correct position for persons of extremely different size.

It is the aim of the present invention to construct an armrest in such a manner that the aforementioned disadvantages are avoided.

The underlying problems are solved according to the present invention in that the armrest is constructed preferably adjustable in the vehicle transverse direction. For that purpose, the armrest is secured at a guide-link parallelogram. The guide members of the guide link parallelogram are connected with a drawspring moving the armrest into end positions. The guide members of the parallelogram are structurally identical parts.

The armrest is held in end positions by means of a locking mechanism. This locking mechanism includes a detent lever which cooperates with recesses at the first guide member. The recesses in the first guide member are provided along a circularly shaped section which surrounds the upper point of rotation of this guide member with a radius. The detent lever is arranged coaxially to the upper pivot pin of the second guide member. The detent lever is held in an end position by way of a leg spring, whereby the leg spring surrounds the pivot pin of the upper pivot point of the second guide member and is supported with its legs at the detent lever and at a wall of the armrest. The armrest is coordinated to a door, whereby a passage is provided between a door inner wall and the armrest, through which an actuating section of the detent lever is accessible.

The principle advantages achieved by the present invention reside in that the passengers of the vehicle (especially the driver) are able to adjust the armrest into a position comfortable to them, whence the comfort is improved. The adjustment of the armrest takes place by way of a guide link parallelogram which requires small structural expenditures. The locking mechanism assures that during high transverse accelerations and also in case of a lateral impact of the vehicle, the armrest does not deflect or move out of its end position. As a result of the arrangement and construction of the detent lever, both a good end position retention as also a simple disengagement is assured.

These and further objects, features and advantages of the present invention will become more apparent from the following description when taken in connection with the accompanying drawing which shows, for purposes of illustration only, one embodiment in accordance with the present invention, and wherein.

Figure 1:
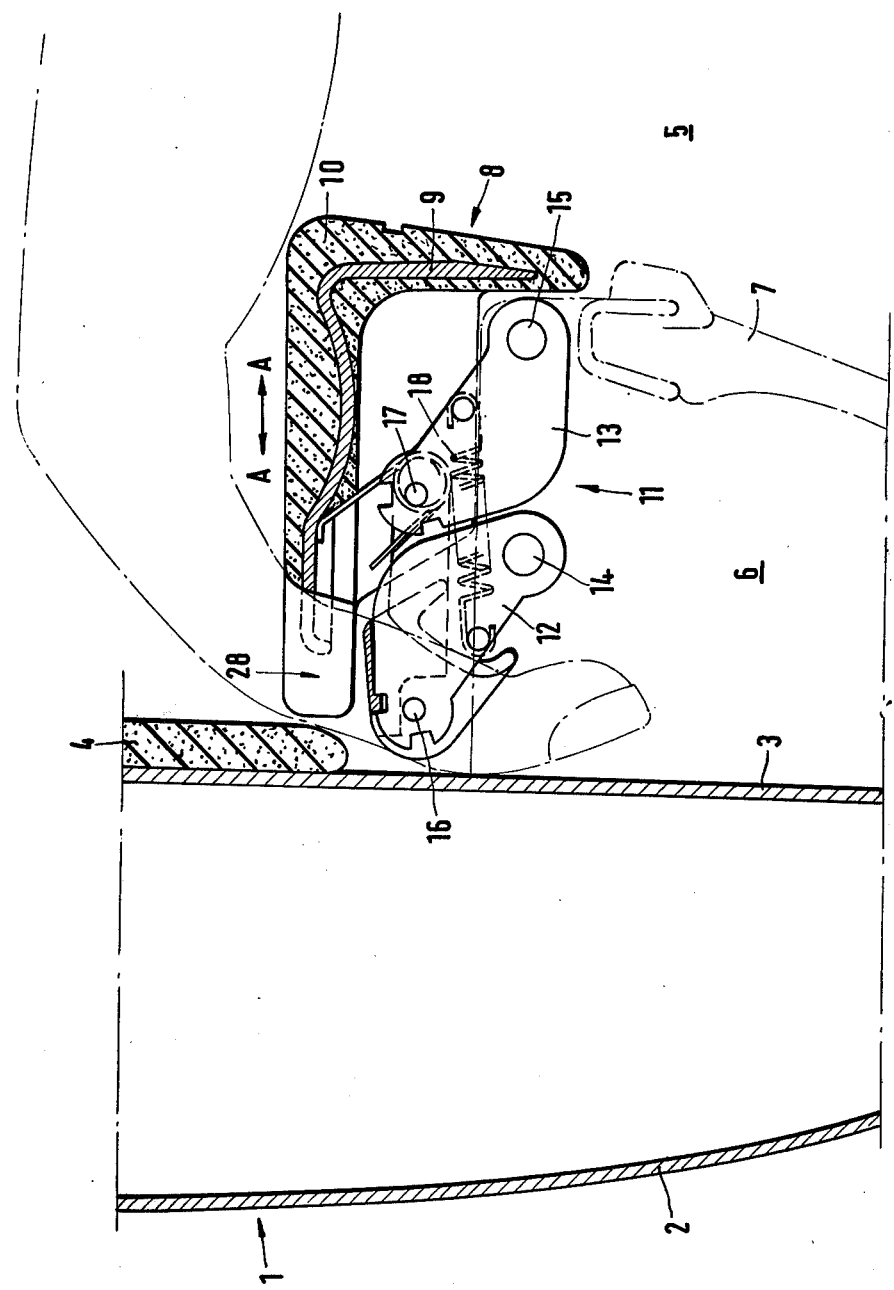
FIG. 1 is a somewhat schematic, partial cross-sectional view through a door with an armrest in accordance with the present invention.

Referring now to the drawing wherein like reference numerals are used throughout the various views to designate like parts, a door generally designated by reference numeral 1 is illustrated in FIG. 1 which includes an outer wall 2 and an inner wall 3. The inner wall 3 is provided with a covering 4 that consists of a yielding material.

Figure 2:
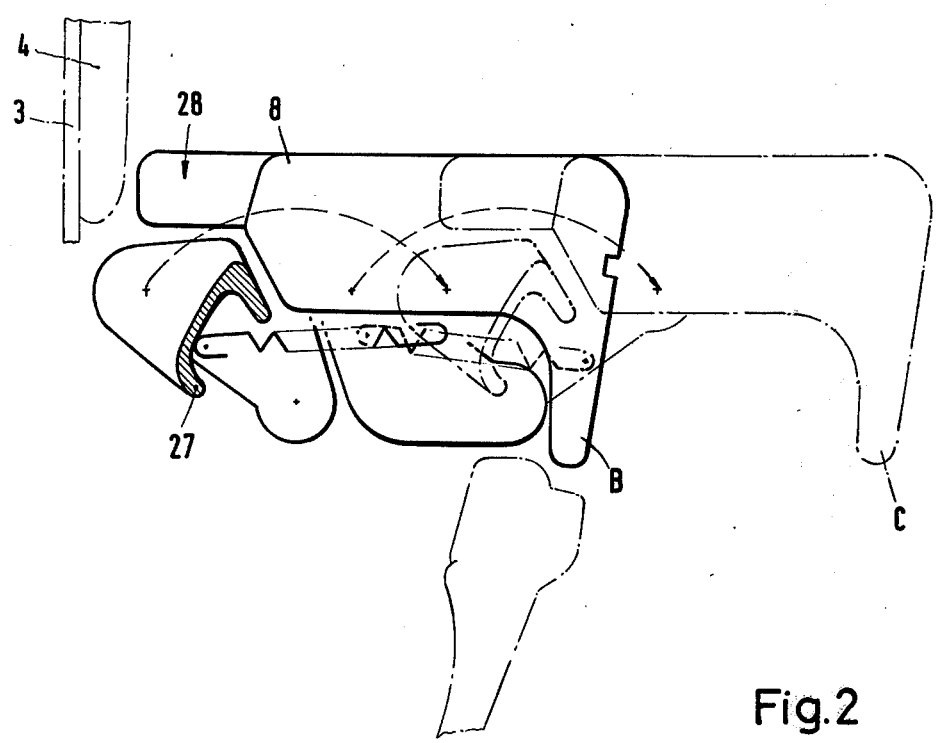
FIG. 2 is a schematic view, similar to FIG. 1, illustrating the two end positions of the armrest in accordance with the present invention.

The door 1 includes on the side facing the passenger space 5 a storage compartment 6 which is delimited by an upright wall 7 extending in the vehicle transverse and longitudinal direction and by an armrest generally designated by reference numeral 8. The armrest 8 is formed by a bearer 9 which is at least partially surrounded by a foamed body 10 of any suitable material such as foamed synthetic resinous material. Therebeyond, the armrest 8 is constructed adjustable, and more particularly in the vehicle transverse direction A-A into the positions B and C (FIG. 2).

For that purpose, a guide link parallelogram generally designated by reference numeral 11 is provided which includes guide members 12 and 13. The guide members 12 and 13 of the guide link parallelogram 11 are structurally identical parts and are supported at the wall 7 by means of lower pivot pins 14 and 15 and at the armrest 8 by means of upper pivot pins 16 and 17. A drawspring 18 engaging at the two guide members 12 and 13 assures that the guide members 12 and 13 do not remain in an intermediate position but are displaced into one of the end positions B or C. The guide link parallelogram 11 is provided at the wall sections of the wall 7 extending transversely to the vehicle longitudinal direction and more particularly inside the storage compartment 6.

Figure 3:
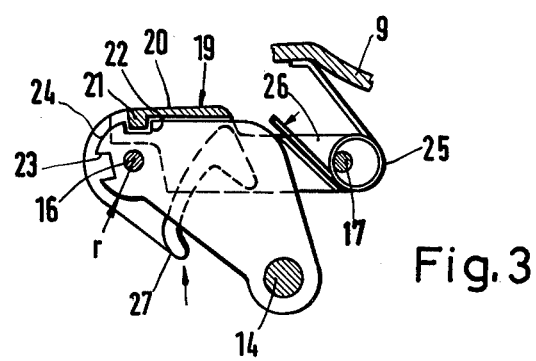
FIGS. 3 to 5 are partial cross-sectional views, similar to FIG. 1, illustrating the armrest in accordance with the present invention in different positions thereof during its displacement from one end position to the other.

In order that the armrest 8 does not automatically pivot out of its once selected position (B or C), for example, in case of a transverse acceleration acting on the vehicle or in case of a lateral impact, a locking mechanism generally designated by reference numeral 19 (FIG. 3) is provided. The locking mechanism 19 includes a detent lever 20 with a nose 21 which, depending on the position of the armrest 8, cooperates with recesses 22 and 23 at the first guide member 12 (FIG. 3). These recesses 22 and 23 are provided along a circularly shaped section 24 which surrounds the center point of the upper pivot pin 16 with a radius r (FIG. 3).

The detent lever is arranged coaxially to the pivot pin 17 of the second guide member 13. The pivot pin 17 is additionally surrounded by a leg spring 25 which is supported with its legs at the bearer 9 of the armrest 8 and at an aperture 26 of the detent lever 20. The leg spring 25 retains the detent lever 20 in an end position. An actuating section 27 connected in one piece with the detent lever 20 is arranged at the detent lever 20 (for example, FIG. 3). This actuating section 27 is accessible by way of a passage 28 (FIGS. 1 and 2) which is provided between the inner wall 3 or the covering 4 and the armrest 8.

For purposes of adjusting the armrest 8, for example, from the position B to the position C, which involves an adjustment of about 52 mm., the detent lever 20 is manually lifted by way of the actuating section 27 (FIG. 1), so that the same is pivoted about the pivot pin 17 and the nose 21 of the detent lever 20 is no longer in engagement with the recess 22 of the first guide member 12

Figure 4:
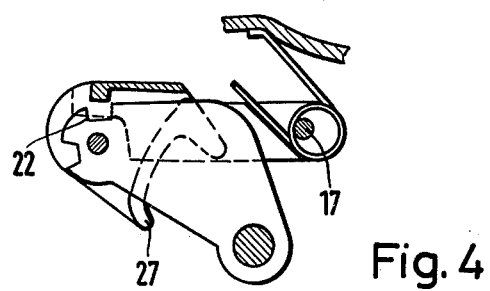
Figure 5:
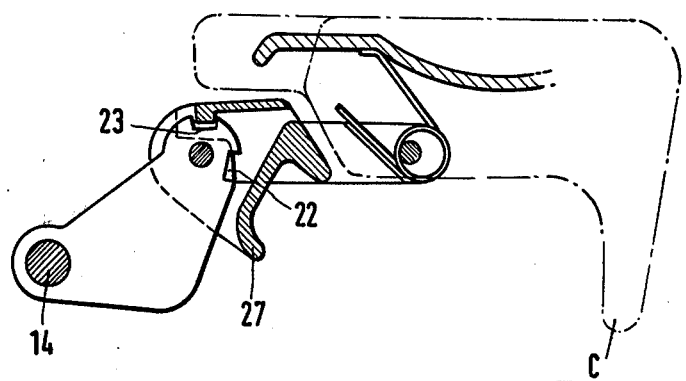

(FIG. 4). Thereafter, the armrest 8 is displaced into the position C by way of the guide members 12 and 13 (FIG. 5). The recess 23 of the first guide member 12 is so pivoted by this operation that the same now comes into engagement with the nose 21 of the detent lever 20 and the armrest 8 is locked in the position C.

The present invention is not limited to the illustrated embodiment. Thus, for example, also the possibility exists to adjust the armrest by way of a hinge, a template guidance or the like.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An armrest for passengers of vehicles comprising: an armrest member and adjustment means for enabling said armrest member to be shifted between two laterally spaced end positions, wherein said armrest member defines an upper wall of a storage compartment, and wherein said adjustment means is located within said storage compartment.

2. An armrest according to claim 1, wherein said adjustment means comprises a parallelogram linkage means and characterized in that the parallelogram linkage means includes guide members which are connected with a draw-spring, said drawspring being arranged so as to bias the armrest into said end positions.

3. An armrest according to claim 4, characterized in that the guide members of the linkage parallelogram means are structurally identical parts.

4. An armrest according to claim 3, characterized in that the armrest further comprises a locking means for holding said armrest in said end positions.

5. An armrest according to claim 3, characterized in that the locking means comprises a detent lever which cooperates with recesses in a first of said guide members.

6. An armrest according to claim 5, characterized in that the first guide member has a circularly shaped section which surrounds the center point of an upper pivot pin of the first guide member with a predetermined radius, said recesses being provided in said circularly shaped section.

7. An armrest according to claim 6, characterized in that the detent lever is arranged coaxially with an upper pivot pin of a second of said guide members.

8. An armrest according to claim 7, characterized in that the detent lever is held in an end position by way of a leg spring means which surrounds a pivot pin of the second guide member, opposite ends of said leg spring means being connected to the detent lever and a wall of the armrest, respectively.

9. An armrest according to claim 8, wherein said detent lever is located in said storage compartment, and wherein a passage is provided between a door inner wall and the armrest, through which an actuating section of the detent lever is accessible.

10. An armrest according to claim 1, characterized in that the armrest further comprises a locking means for holding said armrest in said end position.

11. An armrest for passengers of vehicles comprising: an armrest member and adjustment means for enabling the armrest member to be shifted between two laterally spaced end positions of even height, wherein said adjustment means comprises a parallelogram linkage arrangement.

12. An armrest according to claim 10, wherein said linkage arrangement comprises guide members attached at opposite ends to said armrest member, a vehicle wall member, respectively, and means for locking said linkage arrangement when said armrest is in said end positions.

13. An armrest according to claim 12, wherein said means for locking comprises recesses in an end of a first of said guide members and detent means for engagement in a respective one of said recesses in said end positions.

14. An armrest according to claim 13, comprising spring means for biasing said armrest member into said end positions.

15. An armrest according to claim 11, wherein said armrest member defines an upper wall of a storage compartment, and wherein said adjustment means is located within said storage compartment.

16. An armrest according to claim 15, wherein said two laterally spaced end positions comprise a first position adjacent a vehicle door and over said storage compartment, and a second position, lateral shifted in the vehicle transverse direction away from said vehicle door.

* * * * *